(12) United States Patent
Dobashi et al.

(10) Patent No.: US 10,326,913 B2
(45) Date of Patent: Jun. 18, 2019

(54) IMAGE PROCESSING APPARATUS THAT GENERATES HALFTONE IMAGE DATA AND IMAGE PROCESSING METHOD

(71) Applicant: CANON KABUSHIKI KAISHA, Tokyo (JP)

(72) Inventors: Toshiyuki Dobashi, Tokyo (JP); Shoei Moribe, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/630,162

(22) Filed: Jun. 22, 2017

(65) Prior Publication Data
US 2018/0013920 A1 Jan. 11, 2018

(30) Foreign Application Priority Data
Jul. 11, 2016 (JP) .................................. 2016-137051

(51) Int. Cl.
| | |
|---|---|
| *H04N 1/58* | (2006.01) |
| *H04N 1/405* | (2006.01) |
| *H04N 1/60* | (2006.01) |
| *H04N 1/407* | (2006.01) |
| *H04N 1/409* | (2006.01) |

(52) U.S. Cl.
CPC .............. *H04N 1/58* (2013.01); *H04N 1/405* (2013.01); *H04N 1/407* (2013.01); *H04N 1/4051* (2013.01); *H04N 1/4092* (2013.01); *H04N 1/6008* (2013.01); *H04N 1/6027* (2013.01)

(58) Field of Classification Search
CPC combination set(s) only.
See application file for complete search history.

(56) References Cited

U.S. PATENT DOCUMENTS

| | | | |
|---|---|---|---|
| 7,746,504 B2* | 6/2010 | Namikata | H04N 1/58 |
| | | | 358/1.9 |
| 10,038,820 B2* | 7/2018 | Dobashi | H04N 1/4051 |
| 10,070,008 B2* | 9/2018 | Haruta | H04N 1/00748 |
| 2005/0213160 A1* | 9/2005 | Namikata | H04N 1/40087 |
| | | | 358/3.27 |

(Continued)

FOREIGN PATENT DOCUMENTS

| | | |
|---|---|---|
| JP | 2002290740 A | 10/2002 |
| JP | 2011024049 A | 2/2011 |

*Primary Examiner* — Barbara D Reinier
(74) *Attorney, Agent, or Firm* — Rossi, Kimms & McDowell LLP

(57) ABSTRACT

In order to implement preferred sharpness recovery processing for an image, an image processing apparatus which generates, based on input image data, halftone image data used for an image forming process of forming an image on a print medium. The apparatus converts the input image data into color material amount data used for the image forming process; performs, on the color material amount data, gamma correction to compensate for non-linearity of an input/output density in the image forming process; performs, on the color material amount data after the gamma correction, recovery processing to compensate for sharpness degradation of an image formed by the image forming process; and performs halftone processing on the color material amount data after the recovery processing to generate halftone image data.

15 Claims, 11 Drawing Sheets

(56) References Cited

U.S. PATENT DOCUMENTS

| | | | |
|---|---|---|---|
| 2009/0202167 A1* | 8/2009 | Muijs | H04N 1/409 382/254 |
| 2010/0103455 A1* | 4/2010 | Morikawa | G02B 17/0647 358/1.15 |
| 2011/0052078 A1* | 3/2011 | Yamakawa | G06K 9/036 382/199 |
| 2017/0310851 A1* | 10/2017 | Dobashi | H04N 1/4051 |

* cited by examiner

IMAGE PROCESSING APPARATUS THAT GENERATES HALFTONE IMAGE DATA AND IMAGE PROCESSING METHOD

BACKGROUND OF THE INVENTION

Field of the Invention

The present invention relates to sharpness recovery processing for an image.

Description of the Related Art

It is known that as compared with an input image, the sharpness of an image output by an image forming apparatus such as an inkjet printer is degraded by ink-landing position misalignment, an ink smear (mechanical dot gain), an optical blur (optical dot gain), or the like. At this time, if the frequency characteristic of the output image is obtained in advance, convolution processing (sharpness recovery processing) is performed on the input image with a filter having a reverse characteristic thereof, making it possible to compensate for sharpness degradation. It is known, however, in the image forming apparatus such as the inkjet printer, brightness is decreased in a high-frequency range if the sharpness recovery processing is performed on the input image with the filter having the reverse characteristic.

Japanese Patent Laid-Open No. 2011-24049 (patent literature 1) discloses a technique of measuring a brightness change amount before and after processing in advance, and correcting a luminance value with a change amount measured with respect to each pixel of an input image. Japanese Patent Laid-Open No. 2002-290740 (patent literature 2) describes a method of performing sharpness recovery processing not on a luminance value but on respective output colors (CMYK).

However, the technique described in patent literature 1 corrects the luminance value of the input image based on a luminance change amount measured in advance. It is therefore necessary to measure the luminance change amount separately for the correction. Patent literature 2 controls the correction amount of an edge portion in accordance with an image density range. That is, patent literature 2 does not control a frequency range and cannot suppress a brightness decrease in a high-frequency range.

SUMMARY OF THE INVENTION

According to one aspect of the present invention, an image processing apparatus which generates, based on input image data, halftone image data used for an image forming process of forming an image on a print medium, the apparatus comprises: a conversion unit configured to convert the input image data into color material amount data used for the image forming process; a correction unit configured to perform, on the color material amount data, gamma correction to compensate for non-linearity of an input/output density in the image forming process; a processing unit configured to perform, on the color material amount data after the gamma correction, recovery processing to compensate for sharpness degradation of an image formed by the image forming process; and a halftone processing unit configured to perform halftone processing on the color material amount data after the recovery processing to generate halftone image data.

According to another aspect of the present invention, an image processing apparatus which generates, based on input image data, halftone image data used for an image forming process of forming an image on a print medium, the apparatus comprises: a first processing unit configured to perform, on the input image data, first recovery processing to compensate for sharpness degradation of a low-frequency component lower than a predetermined frequency in an image formed by the image forming process; a conversion unit configured to convert the input image data after the first recovery processing into color material amount data used for the image forming process; a correction unit configured to perform, on the color material amount data, gamma correction to compensate for non-linearity of an input/output density in the image forming process; a second processing unit configured to perform, on the color material amount data after the gamma correction, second recovery processing to compensate for sharpness degradation of a high-frequency component higher than the predetermined frequency in the image formed by the image forming process; and a halftone processing unit configured to perform halftone processing on the color material amount data after the second recovery processing to generate halftone image data.

According to still another aspect of the present invention, an image processing apparatus which generates, based on input image data, halftone image data used for an image forming process of forming an image on a print medium, the apparatus comprises: a conversion unit configured to convert the input image data into color material amount data used for the image forming process; a first processing unit configured to perform, on the color material amount data, first recovery processing to compensate for sharpness degradation of a low-frequency component lower than a predetermined frequency in an image formed by the image forming process; a correction unit configured to perform, on the color material amount data after the first recovery processing, gamma correction to compensate for non-linearity of an input/output density in the image forming process; a second processing unit configured to perform, on the color material amount data after the gamma correction, second recovery processing to compensate for sharpness degradation of a high-frequency component higher than the predetermined frequency in the image formed by the image forming process; and a halftone processing unit configured to perform halftone processing on the color material amount data after the second recovery processing to generate halftone image data.

The present invention provides a technique of implementing preferred sharpness recovery processing for an image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. Note that the following embodiments are merely examples and do not intend to limit the scope of the present invention.

First Embodiment

As the first embodiment of an image processing apparatus according to the present invention, a description will be given below by taking an image processing apparatus which generates a halftone image utilized in an image forming unit as an example.

<Outline>

In general, multi-valued image data input to a printer is quantized to binary dot data by halftone processing, and that dot is printed on a print medium. A dot diameter is set to be larger than a pixel in order to cope with the size of the dot, position fluctuations, or the like. Consequently, a phenomenon called a dot gain occurs, and the relationship between an input density value and an output density value has a non-linear characteristic. In order to correct this non-linearity, non-linear output gamma correction processing is performed on a density value input to the halftone processing.

The present inventor determines that this non-linear output gamma correction processing is a factor for decreasing brightness. Therefore, a method of suppressing a brightness decrease caused by this non-linear output gamma correction processing will be described. More specifically, the brightness decrease is suppressed by performing sharpness recovery processing (also to be referred to as recovery processing hereinafter) for at least some frequency components of an input image after the output gamma correction processing.

<Apparatus Arrangement>

Figure 1:
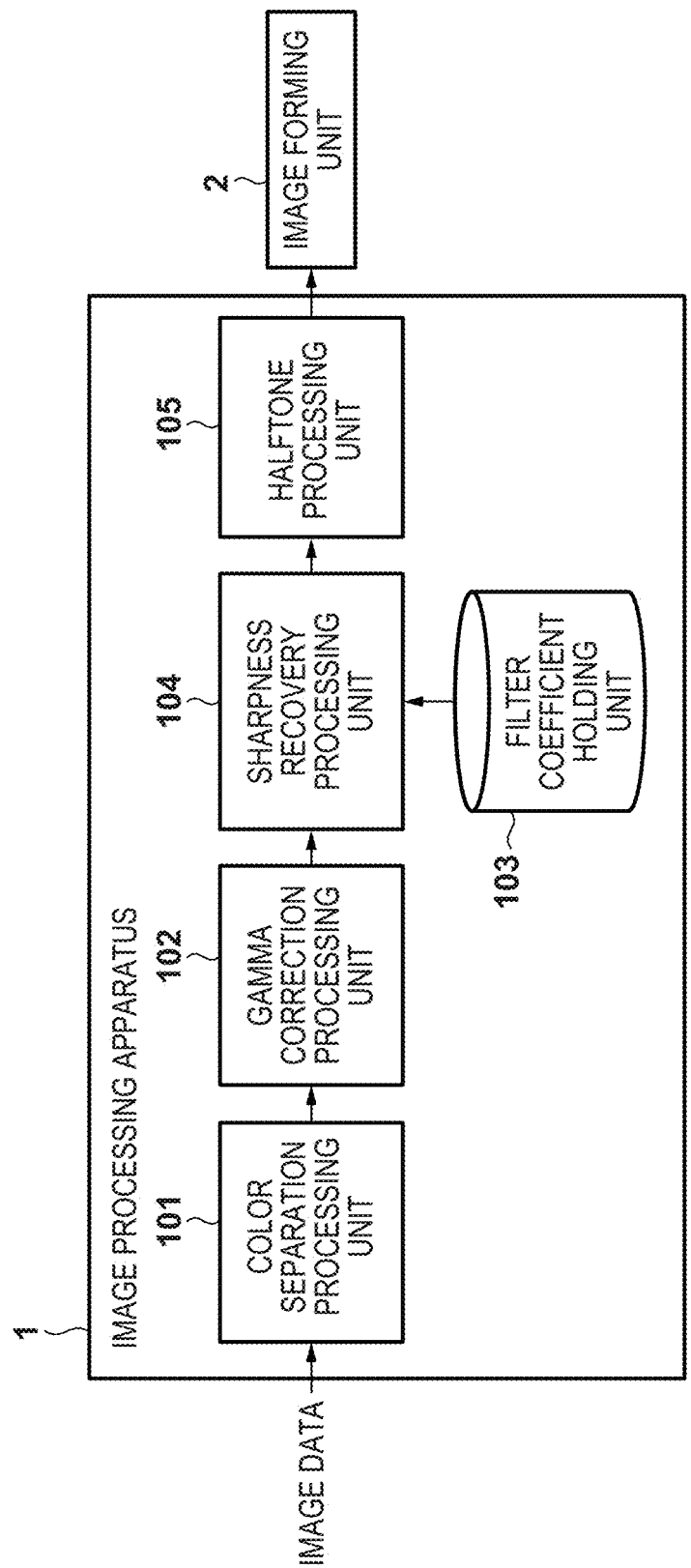
FIG. 1 is a block diagram showing the arrangement of an image forming apparatus according to the first embodiment.

FIG. 1 is a block diagram showing the arrangement of an image forming apparatus according to the first embodiment. In the first embodiment, a method of performing recovery processing for all frequency components at the succeeding stage of a gamma correction processing unit (immediately before a halftone processing unit) will be described.

An image processing apparatus 1 is a mechanism which generates print data for making drawing by an image forming unit 2 from input image data and includes a color separation processing unit 101, a gamma correction processing unit 102, a filter coefficient holding unit 103, a sharpness recovery processing unit 104, and a halftone processing unit 105.

The color separation processing unit 101 makes, with reference to a color separation table, color separation of input image data of a RGB format into color material amount data corresponding to a color material used by the image forming unit 2. The color separation processing unit 101 makes color separation of the input image data into color material amount data corresponding to, for example, four colors of cyan (C), magenta (M), yellow (Y), and black (K). The gamma correction processing unit 102 performs output gamma correction processing on the color material amount data so that the relationship with lightness on a storage medium changes linearly.

Figure 2:
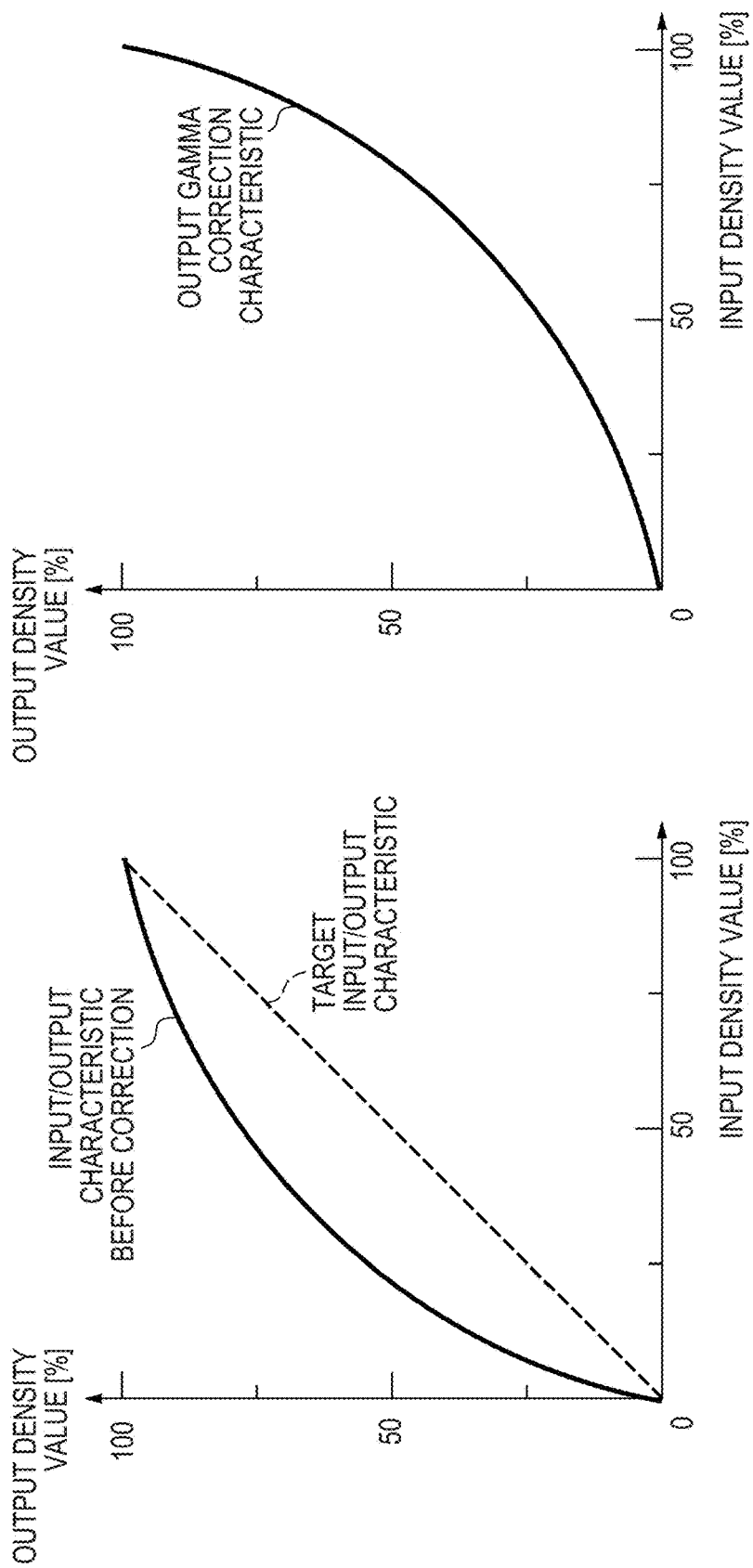
FIGS. 2A and 2B are graphs for explaining output gamma correction characteristics.

FIGS. 2A and 2B are graphs for explaining output gamma correction characteristics. FIG. 2A shows a printer gamma characteristic, and an output density value changes non-linearly relative to a change in an input density value. That is, an input/output density has non-linearity. FIG. 2B shows the output gamma correction characteristic which is the reverse characteristic of the printer gamma characteristic described above.

The filter coefficient holding unit 103 holds a filter coefficient for sharpness recovery created in advance by a method to be described later. The sharpness recovery processing unit 104 loads the filter coefficient from the filter coefficient holding unit 103 and performs recovery processing by a convolution operation for the color material amount data for each color after the output gamma correction. The recovery processing is image processing to compensate for sharpness degradation of an image formed by the image forming unit 2. Note that fast Fourier transformation or the like may be used for the recovery processing. In this case, integration processing is performed after conversion into a frequency space is performed by using fast Fourier transformation, and inverse fast Fourier transformation is performed.

The halftone processing unit 105 performs quantization processing in which the color material amount data for each color output by the sharpness recovery processing unit 104 is converted into binary (alternatively, two or more values and the number of tones smaller than the number of input tones) dot data. A description will be given here by using a dither method for the halftone processing. However, the present invention is not limited to this. For example, a known error diffusion method (average density storage method), blue noise mask, green noise mask, or the like may be used. In the dither method, the color material amount data is converted into the dot data by reading out a threshold set in a dither matrix in accordance with a pixel position and comparing the threshold with the value of the color material amount data for each pixel.

The image forming unit 2 forms, on a print medium, halftone image data (dot data) provided from the halftone processing unit 105 by using color materials of four colors of cyan (C), magenta (M), yellow (Y), and black (K).

<Brightness Decrease Caused by Recovery Processing>

First, the brightness decrease caused by the recovery processing which is a problem in conventional image processing will be described.

In the image forming apparatus such as the printer, the sharpness of an output image is degraded by a smear or fluctuation of a dot position. On the other hand, if a frequency characteristic P(u) of the output image in a spatial frequency u can be obtained, it is possible to compensate for sharpness degradation of the output image by performing the recovery processing on the input image with a filter having a reverse characteristic R(u) of P(u)=1/P(u).

Figure 3:
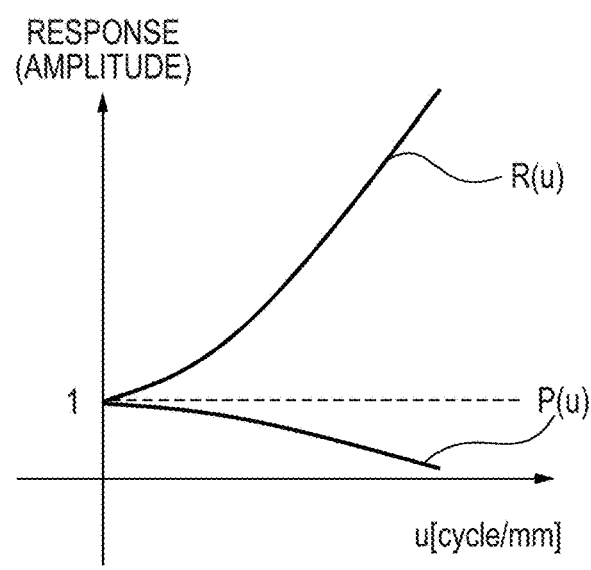
FIG. 3 is a graph for explaining the frequency characteristic and its reverse characteristic of the image forming apparatus.

FIG. 3 is a graph for explaining the frequency characteristic and its reverse characteristic of the image forming apparatus. For example, if the frequency characteristic of the output image is a characteristic indicated by the curve P(u), the reverse characteristic 1/P(u) is a characteristic indicated by a curve R(u). At this time, if an image that has undergone recovery processing by using a filter obtained by performing inverse Fourier transformation on the reverse characteristic R(u) is output, it is possible to obtain an image with the suppressed sharpness degradation. However, if the sharpness recovery processing is performed on the input image with the filter having the reverse characteristic as described in "Description of the Related Art", average brightness is decreased in a high-frequency range.

Figure 4:
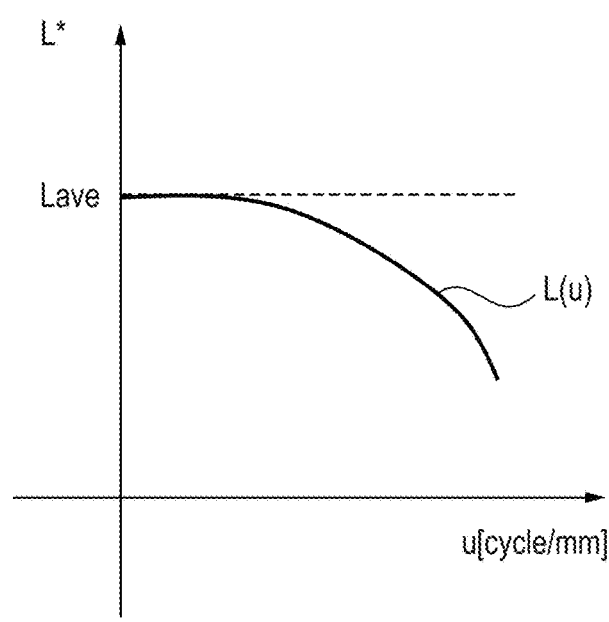
FIG. 4 is a graph for explaining a brightness decrease if sharpness recovery processing is performed by the reverse characteristic of the frequency characteristic.

FIG. 4 is a graph for explaining a brightness decrease if the recovery processing is performed by the reverse characteristic of the frequency characteristic. A brightness decrease if the recovery processing is performed by the reverse characteristic R(u) is represented as, for example, a curve L(u). L(u) indicates the average brightness of the output image relative to the frequency u if the image processing is performed on a sinusoidal pattern image (an image having a density change of a sinusoidal pattern) having the frequency u and the amplitude of average lightness Lave. A factor responsible for such a brightness decrease is an increase in average output density value by the output gamma correction processing performed after the recovery processing.

A factor for causing the brightness decrease by the output gamma correction processing will be described below with reference to FIGS. 5A and 5B. A description will be given here by taking rectangular wave images having two types of pixel values as examples, for the sake of descriptive simplicity.

Figure 5A:
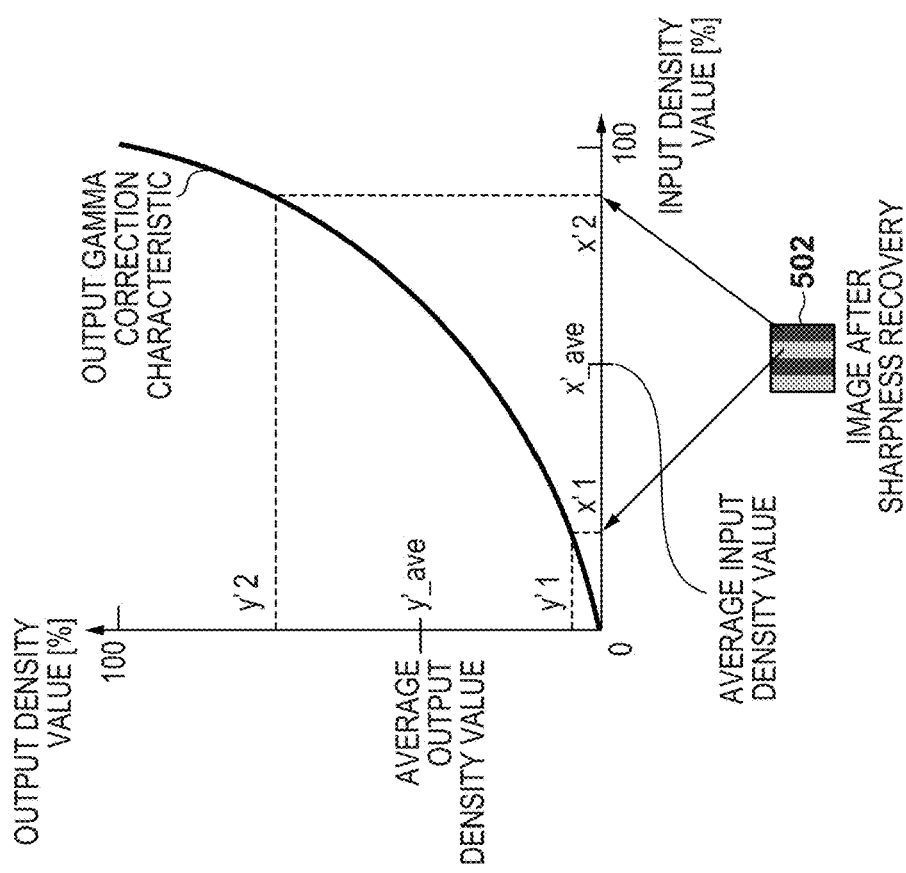
FIGS. 5A and 5B are graphs each for explaining an increase in average output density value by output gamma correction.
Figure 5B:
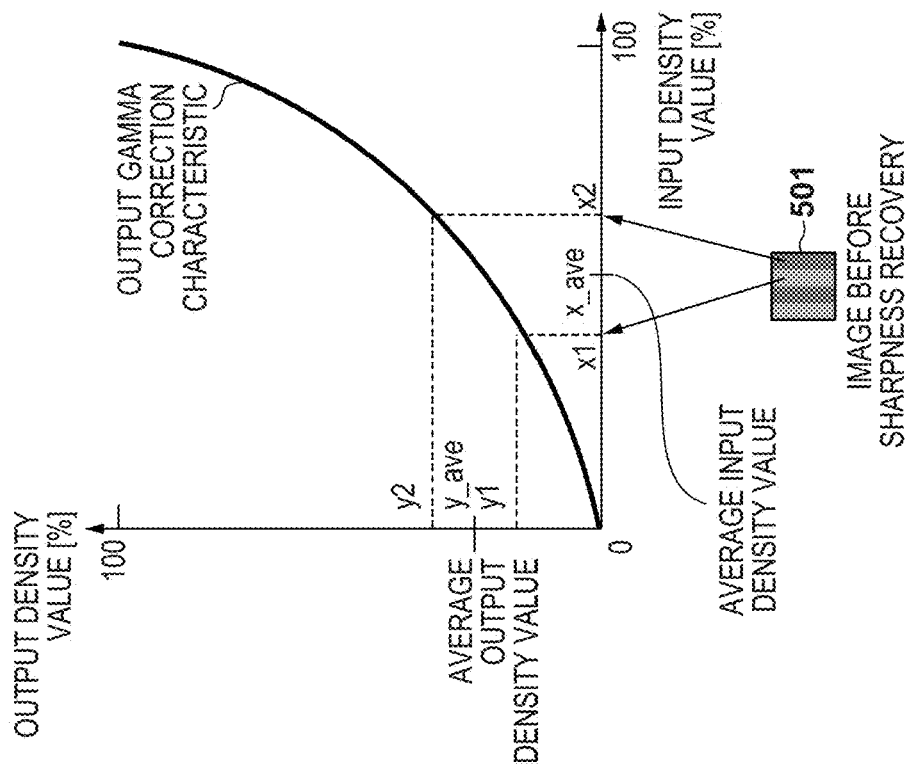

FIGS. 5A and 5B are graphs each for explaining an increase in the average output density value by the output gamma correction. An image 501 in the lower portion of FIG. 5A shows an image before the recovery processing. If the output gamma correction processing is performed on respective pixel values x1 and x2 of this image, output density values after the output gamma correction become y1 and y2, and an average value thereof becomes y_ave.

An image 502 in the lower portion of FIG. 5B shows an image after the recovery processing. If the recovery processing is performed, contrast is emphasized while maintaining the average value of the input image. If the output gamma correction processing is performed on respective pixel values x'1 and x'2 of this image, output density values after the output gamma correction become y'1 and y'2, and an average value thereof becomes y'_ave. The output gamma correction characteristic of the printer is generally convex downward in a non-linear shape. Therefore, y'_ave>y_ave holds even if x_ave=x'_ave.

This average output density value increases in accordance with the recovery amount of the recovery processing. The characteristic of the sharpness recovery filter in the printer becomes a characteristic as indicted by R(u) of FIG. 3, the brightness decrease occurs more easily in a high-frequency range that needs a large recovery amount.

<Filter Creation Method>

As described above, in the first embodiment, the recovery processing is performed on the color material amount data after the output gamma correction processing. However, the sharpness degradation easily occurs in the high-frequency range, and thus the filter of its reverse characteristic has a large recovery amount in the high-frequency range. Therefore, if recovery is performed with such a filter, a pixel value after the sharpness recovery may exceed an expressible range in a high-frequency range that needs recovery amount is especially large.

For example, if the pixel value is given by 8 bits, the expressible range is from 0 to 255, and it is impossible to express a negative value or a value over 255. In this case, clipping processing for rounding a value to an expressible value occurs. Even with this clipping processing, the average density value of an image may vary.

Therefore, a filter recovery amount is set here so as to prevent clipping from occurring. Clipping occurs depending on an image, and thus a filter is designed here so as to prevent the clipping from occurring by using a chart image having a predetermined amplitude with reference to an intermediate value in the expressible range. That is, the upper limit of compensation for the sharpness degradation is restricted.

Figure 6:
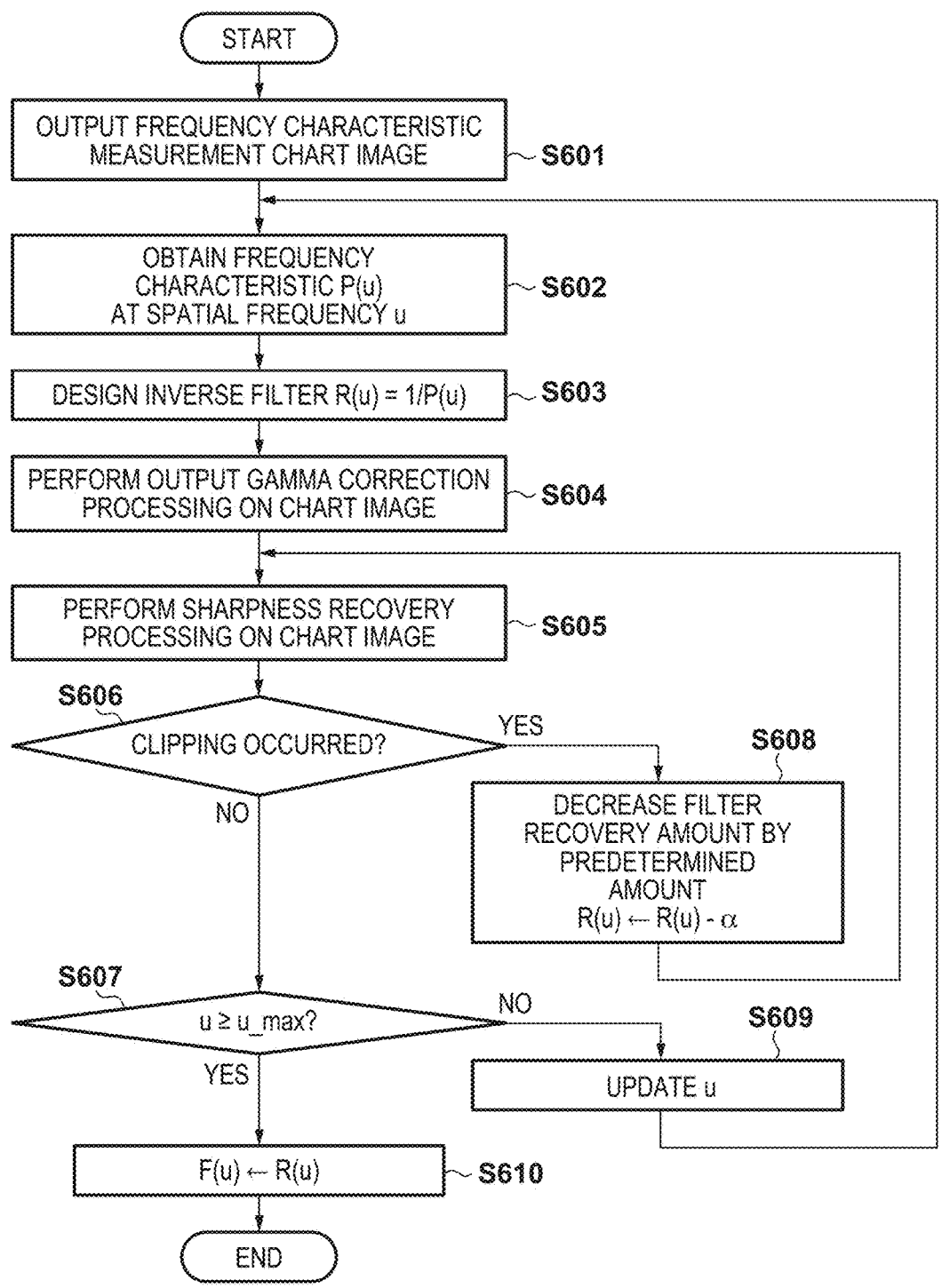
FIG. 6 is a flowchart related to the creation of a sharpness recovery filter according to the first embodiment.

FIG. 6 is a flowchart related to the creation of a sharpness recovery filter F(u) according to the first embodiment. A processing unit (not shown) in the image processing apparatus 1 or an external information processing apparatus (PC) may be configured to perform a process of creating the sharpness recovery filter. Note that a process to be described below is performed for each color material of the image forming apparatus. A description will be given here by taking black (K) as an example.

In step S601, the image forming unit 2 outputs a sharpness measurement chart. Note that control is taken so as not to perform the recovery processing in outputting the measurement chart.

Figure 7:
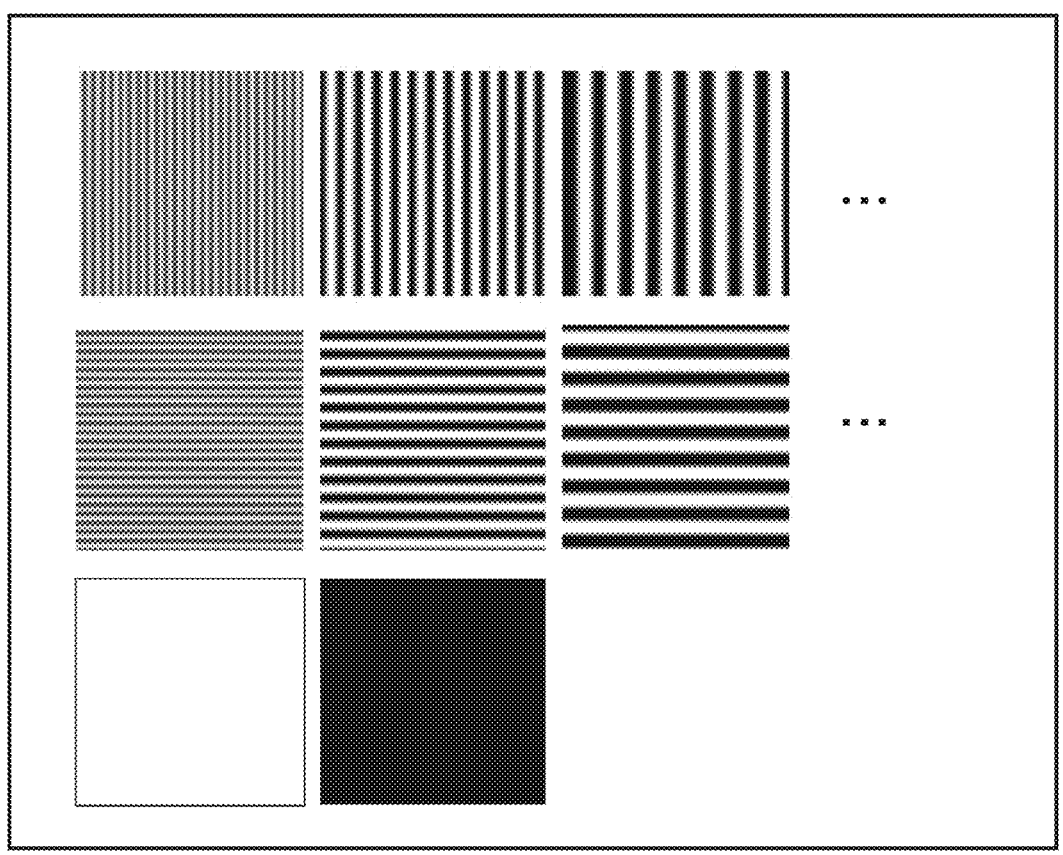
FIG. 7 is a view showing an example of a frequency characteristic measurement chart.

FIG. 7 is a view showing an example of a frequency characteristic measurement chart. The measurement chart is an image chart which includes a plurality of sinusoidal pattern images different from each other in frequency or direction and uniform pattern images (for example, a white solid image and a black solid image).

In step S602, a measurement apparatus (not shown) is used to obtain, from the measurement chart, information needed to obtain a frequency characteristic. For example, a scanner, a digital camera, a microscope, a microdensitometer, or the like can be used for the measurement apparatus. The frequency response value P(u) of the image forming apparatus is calculated based on the obtained information. The frequency response value P(u) can use, for example, an optical transfer function (MTF) calculated by using:

$$P(u)=C(u)/C' \qquad (1)$$

where u is a frequency of the sinusoidal pattern image, $C(u)=\{Max(u)-Min(u)\}/\{Max(u)+Min(u)\}$, and $C'=(White-Black)/(White+Black)$, and note that Max(u) is maximum lightness of the sinusoidal pattern image that changes at the frequency u, Min(u) is minimum lightness of the sinusoidal pattern image that changes at the frequency u, and each of White and Black is lightness of the uniform pattern image. Of course, calculation of the optical transfer function is not limited to equation (1) described above and may use, for example:

$$P(u)=\{Max(u)-Min(u)\}/(White-Black) \qquad (1')$$

Note that the frequency response value P(u) is calculated here by using each of Max(u), Min(u), White, and Black as the lightness. However, the frequency response value P(u) may be calculated by using, for example, luminance, a density, the device RGB value of the measurement apparatus, or the like.

The frequency characteristic P(u) may be obtained, as the measurement chart output in step S601, by using not the sinusoidal pattern images as shown in FIG. 7 but rectangular wave pattern images. In this case, the value of a Contrast Transfer Function (CTF) calculated by applying equation (1) to the rectangular wave images is used as the frequency characteristic P(u). Alternatively, an MTF value obtained by converting the CTF value using known Coltman's Correction may be used for the frequency characteristic P(u).

In step S603, the frequency characteristic of the sharpness recovery filter R(u)=1/P(u) is calculated based on the spatial frequency characteristic P(u) obtained in step S602.

In step S604, the output gamma correction processing is performed on a measurement chart image by using the output gamma correction characteristic of the image forming unit 2.

In step S605, inverse Fourier transformation is performed on the frequency characteristic of the sharpness recovery filter calculated in step S603, calculating a filter coefficient. Then, the convolution operation (recovery processing) is performed on the measurement chart image after the output gamma correction processing obtained in step S604. A 63×63 size is used here as a filter size. Of course, a filter of another size may be used.

In step S606, it is determined whether the image after the recovery processing obtained in step S605 includes a pixel value exceeding the expressible range (here, from 0 to 255). That is, it is determined whether clipping occurs. If it is determined that clipping occurs, the process advances to step S608. If it is determined that clipping does not occur, the process advances to step S607. Note that allowing slight occurrence of clipping, it may be determined whether the image includes a pixel value exceeding a range (for example, from −5 to 260) wider than the expressible range.

In step S608, R(u) is updated by decreasing the filter recovery amount by a predetermined amount α. Then, the process returns to step S605 to perform the recovery processing again. This series of operations is repeated until clipping does not occur any more.

In step S607, u is compared with an output resolution u_max of the image forming apparatus. If u≥u_max, R(u) is set to F(u), terminating the process (step S610). On the other hand, if not u≥u_max, u is updated in step S609, and the process returns to step S602.

With the above-described process, it is possible to design a filter capable of maximum sharpness recovery in a range in which clipping does not occur (the average output density value does not change). A generated filter is stored in the filter coefficient holding unit 103.

As described above, according to the first embodiment, the recovery processing is performed at the succeeding stage of the gamma correction processing unit. This makes it possible to avoid the increase in average output density value caused by the output gamma correction processing that occurs in a conventional processing arrangement. Furthermore, it becomes possible to perform preferred recovery processing by creating, in advance, a sharpness recovery filter capable of reducing a density fluctuation caused by occurrence of clipping. That is, it becomes possible to appropriately recover sharpness up to a high-frequency component while suppressing the brightness decrease in the high-frequency range.

Note that in the description above, the frequency characteristic of the output image is treated as the one-dimensional function P(u). It is known, however, that the frequency characteristic of the printer has anisotropy. It is therefore preferable that the frequency characteristic of the sharpness recovery filter is designed as two-dimensional function P(u, v) of the frequency u and a frequency v in two directions perpendicular to each other.

The example in which the color materials of four colors (N colors) of C, M, Y, and K are included has been described as the arrangement of the image forming unit 2. However, the type of color materials is not limited. For example, light ink low in density, a spot ink such as red or green, and a white ink may be used. Furthermore, in the description above, the recovery processing is performed on all (N) the color material amount data. However, the recovery processing may be performed on only some (less than N) of the color material amount data. The recovery processing may be performed on only, for example, a visually conspicuous color (for example, K). Moreover, unique sharpness recovery filters need not necessarily be prepared for all the color materials, and the same filter may be assigned to them.

Second Embodiment

In the second embodiment, a mode will be described in which recovery processing for a low-frequency component with infrequent occurrence of a brightness decrease and recovery processing for a high-frequency component with frequent occurrence of the brightness decrease are performed separately from each other. In particular, an example will be described in which the recovery processing for the low-frequency component is performed at the preceding stage of a gamma correction processing unit, and the recovery processing for the high-frequency component is performed at the succeeding stage of the gamma correction processing unit.

Figure 8:
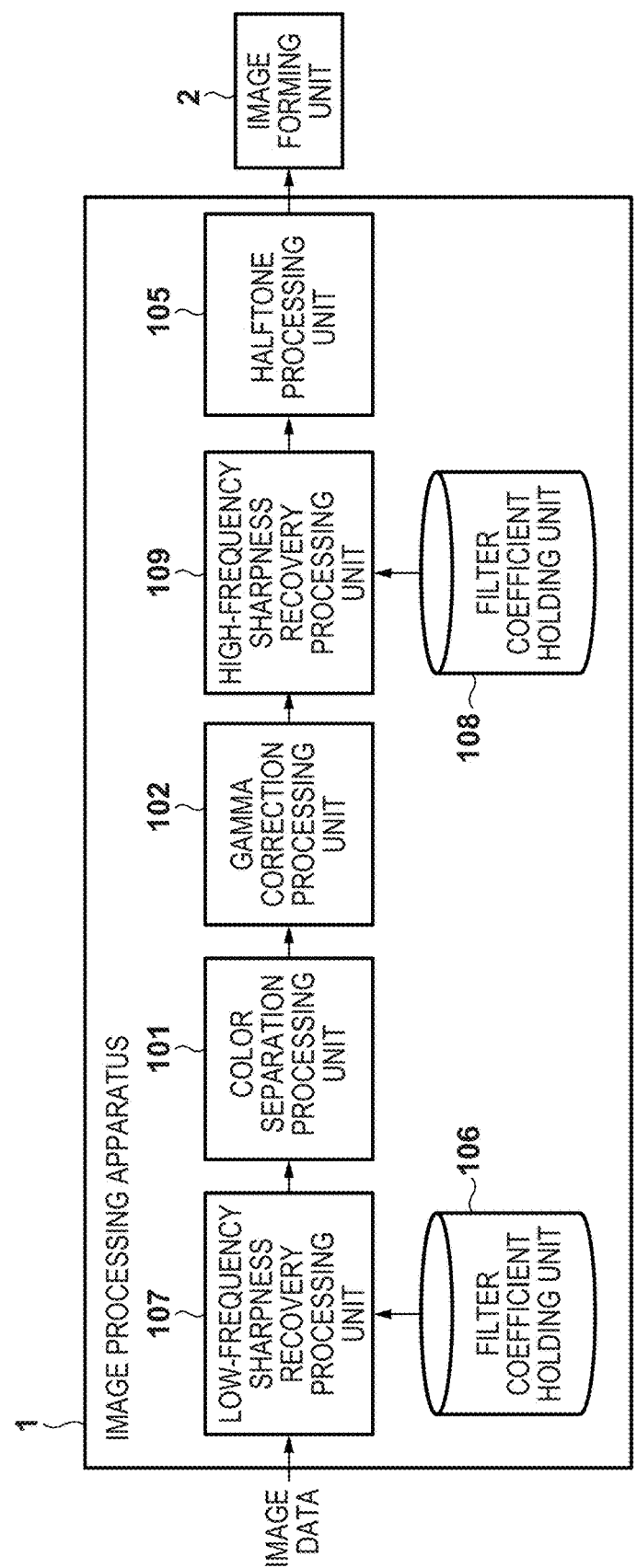
FIG. 8 is a block diagram showing the arrangement of an image forming apparatus according to the second embodiment.

FIG. 8 is a block diagram showing the arrangement of an image forming apparatus according to the second embodiment. Note that a color separation processing unit 101, a gamma correction processing unit 102, and a halftone processing unit 105 are the same as in the first embodiment (FIG. 1), and thus a description thereof will be omitted.

A low-frequency sharpness recovery processing unit 107 loads, from a filter coefficient holding unit 106, a filter coefficient for sharpness recovery with respect to the low-frequency component and performs a convolution operation on input image data. By doing so, the recovery processing is performed in which the sharpness of the low-frequency component lower than a predetermined frequency is mainly recovered.

A high-frequency recovery processing unit 109 loads, from a filter coefficient holding unit 108, a filter coefficient for sharpness recovery with respect to the high-frequency component and performs a convolution operation on color material amount data output by the gamma correction processing unit 102. By doing so, the recovery processing is performed in which the sharpness of the high-frequency component higher than a predetermined frequency is mainly recovered.

<Filter Creation Method>

A filter creation method in the second embodiment will be described below. A sharpness recovery filter is designed here by dividing it into a filter which mainly recovers the low-frequency component and a filter which mainly recovers the high-frequency component at a predetermined frequency ub as a boundary.

Decision of Predetermined Frequency ub

Figure 9:
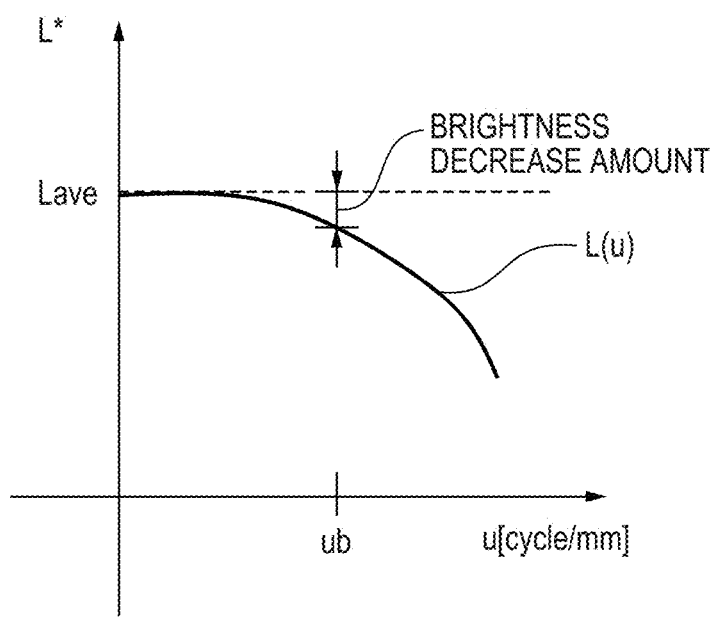
FIG. 9 is a graph for explaining a predetermined frequency at which a brightness decrease becomes equal to or more than a predetermined amount.

FIG. 9 is a graph for explaining a predetermined frequency at which a brightness decrease becomes equal to or more than a predetermined amount. As shown in FIG. 9, let the predetermined frequency ub be a frequency at which brightness starts to decrease by the predetermined amount if recovery processing for all frequency components is performed before output gamma correction processing. A brightness decrease amount is used below as a reference to decide the predetermined frequency ub. Alternatively, however, a luminance decrease amount or a density increase amount may be used.

Figure 10:
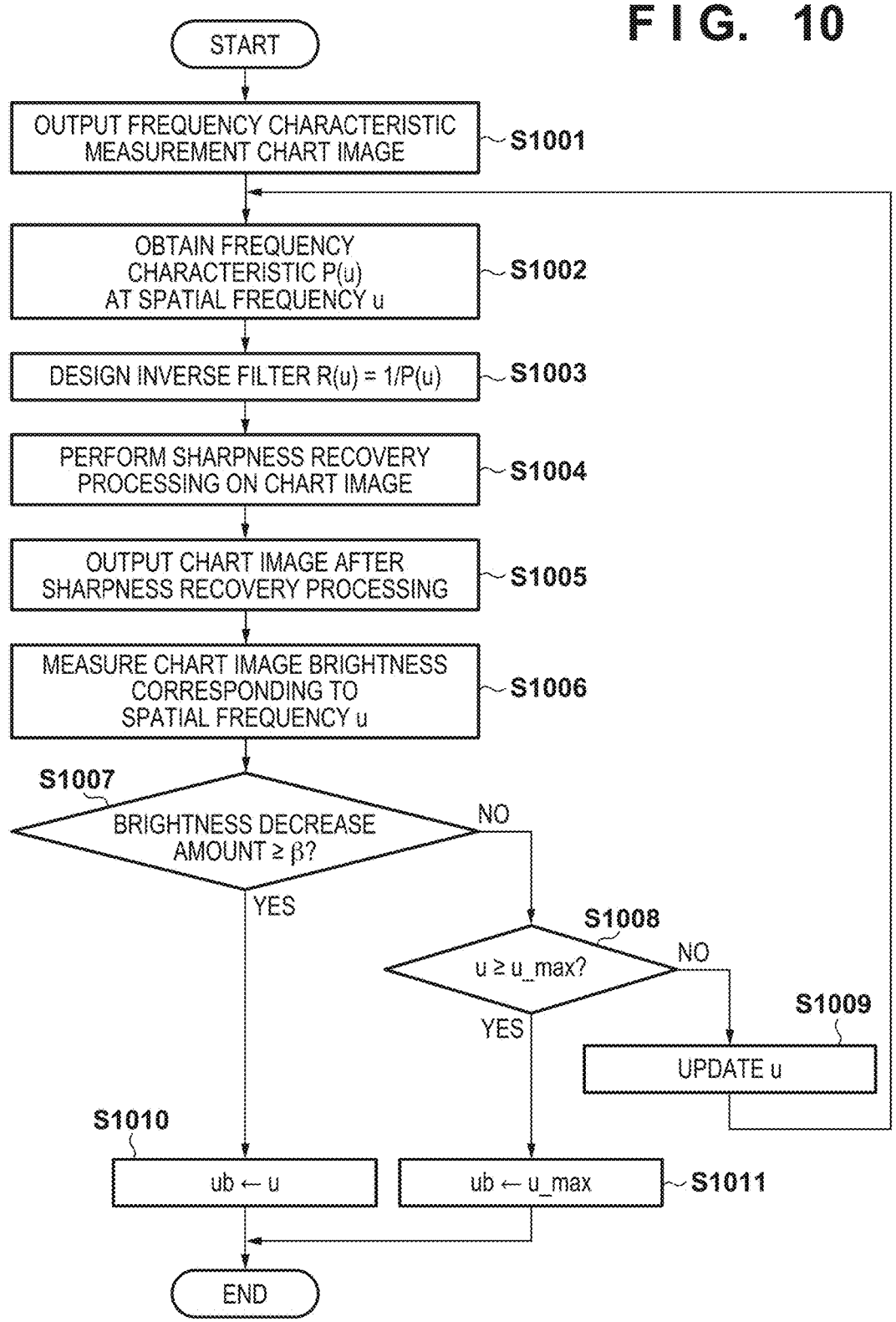
FIG. 10 is a flowchart related to the decision of the predetermined frequency.

FIG. 10 is a flowchart related to the decision of the predetermined frequency (ub). Note that steps S1001 to S1003, and steps S1008 and S1009 are the same as steps S601 to S603, step S607, and step S609 in the first embodiment (FIG. 6), and thus a detailed description thereof will be omitted.

In step S1001, an image forming unit 2 is used to output a frequency characteristic measurement chart. Note that control is taken so as not to perform recovery processing in outputting the measurement chart. In step S1002, a measurement apparatus (not shown) is used to obtain, from the measurement chart, information needed to obtain a frequency characteristic. A frequency response value P(u) of the image forming apparatus is calculated based on the obtained information. In step S1003, a frequency characteristic of the sharpness recovery filter R(u)=1/P(u) is calculated based on the space frequency characteristic P(u) obtained in step S1002.

In step S1004, inverse Fourier transformation is performed on the frequency characteristic of the sharpness recovery filter calculated in step S1003, calculating a filter coefficient. Then, the convolution operation is performed on a chart image by using the calculated filter coefficient. A 63×63 size is used here as a filter size. The color space of a measurement chart image is converted from RGB to YCbCr (luminance and color differences), and the convolution operation is performed on Y (luminance signal). In step S1005, the image forming unit 2 is used to output a chart image after the recovery processing.

In step S1006, the measurement apparatus (not shown) is used to measure the average brightness of a portion at a spatial frequency u of the chart image output in step S1005. In step S1007, it is determined whether the brightness measured in step S1006 decreases by a predetermined amount β or more relative to desired brightness.

If it is determined that the brightness decreases by β or more, u at that time is set as ub, terminating the process (step S1010). Otherwise, u is compared with an output resolution u_max of the image forming apparatus (step S1008). If u≥u_max, u_max is set as ub, terminating the process (step S1011). If not u≥u_max, u is updated (step S1009), and the process returns to step S1002. Note that the frequency u to be processed is preferably changed sequentially from a low frequency to a high frequency.

Filter Creation for High-Frequency Component and Low-Frequency Component

After ub is decided, a sharpness recovery filter Fh(u) which mainly recovers a frequency component equal to or higher than ub and a sharpness recovery filter Fl(u) which mainly recovers a frequency component lower than ub are created sequentially. Respective creation methods will be described below.

First, the sharpness recovery filter Fh(u) which mainly recovers the frequency component equal to or higher than ub is created. A procedure described in the first embodiment (FIG. 6) (note that u starts from ub) or a simple edge enhancement filter may be used for this. A Laplacian filter of 3×3 is used here. A generated filter is stored in the filter coefficient holding unit 108.

Then, the sharpness recovery filter Fl(u) which mainly recovers the frequency component lower than ub is created. Fl(u) is designed based on a chart image to which recovery processing by Fh(u) is applied.

Figure 11:
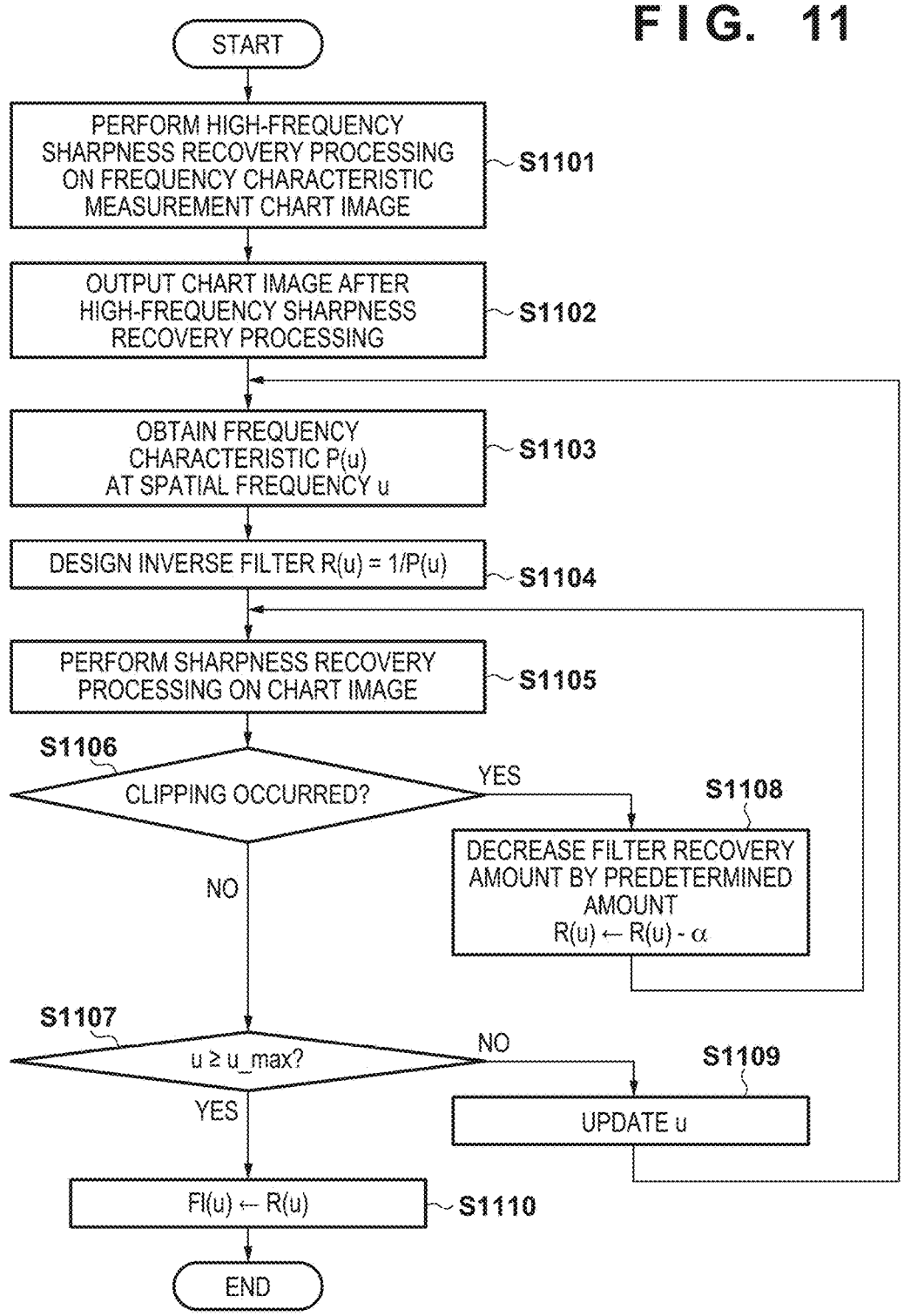
FIG. 11 is a flowchart related to the creation of a sharpness recovery filter according to the second embodiment.

FIG. 11 is a flowchart related to the creation of the sharpness recovery filter Fl(u) according to the second embodiment. Note that steps S1103 and S1104, and steps S1106 to S1109 are, respectively, the same as steps S602 and S603, and steps S606 to S609 of the first embodiment (FIG. 6) in process, and thus a detailed description thereof will be omitted.

In step S1101, the recovery processing by Fh(u) is performed on the frequency characteristic measurement chart. In step S1102, the image forming unit 2 is used to output a chart image after the recovery processing created in step S1101.

In step S1103, the measurement apparatus (not shown) is used to obtain, from the measurement chart, information needed to obtain a frequency characteristic. The frequency response value P(u) of the image forming apparatus is calculated based on the obtained information. In step S1104, the frequency characteristic of the sharpness recovery filter R(u)=1/P(u) is calculated based on the spatial frequency characteristic P(u) obtained in step S1103.

In step S1105, inverse Fourier transformation is performed on the frequency characteristic of the sharpness recovery filter calculated in step S1104, calculating a filter coefficient. Then, a convolution operation is performed on a measurement chart image by using the calculated filter coefficient, performing the recovery processing. A 63×63 size is used here as a filter size. The color space of a measurement chart image is converted from RGB to YCbCr (luminance and color differences), and the convolution operation is performed on Y (luminance signal).

In step S1106, it is determined whether the image after the recovery processing includes a pixel value exceeding an expressible range (here, from 0 to 255). That is, it is determined whether clipping occurs. If it is determined that clipping occurs, the process advances to step S1108. If it is determined that clipping does not occur, the process advances to step S1107.

In step S1108, R(u) is updated by decreasing a filter recovery amount by a predetermined amount α. Then, the process returns to step S1105 to perform the recovery processing again. This series of operations is repeated until clipping does not occur any more.

In step S1107, u is compared with the output resolution u_max of the image forming apparatus. If u≥u_max, R(u) is set to Fl(u), terminating the process (step S1110). On the other hand, if not u≥u_max, u is updated in step S1109, and the process returns to step S1103. A generated filter is stored in the filter coefficient holding unit 106.

As described above, according to the second embodiment, only the recovery processing for the high-frequency component is performed after the output gamma correction processing. Consequently, the convolution operation using a filter of a small size such as 3×3 allows processing for color material data for each color. Furthermore, low-frequency recovery processing that needs a filter of a large size such as 63×63 is performed only on a luminance signal before the output gamma correction processing. This makes it possible to reduce a total calculation amount needed for the recovery processing, as compared with the first embodiment.

A sharpness recovery filter for the low-frequency component is created with reference to a chart image after processing by a sharp recovery filter for the high-frequency component. This allows a large-sized sharpness recovery filter for the low-frequency component to eliminate an error with a desired frequency characteristic caused by using a small-sized filter as the sharpness recovery filter for the high-frequency component. Note that the size of the sharpness recovery filter for the high-frequency component is given by 3×3, and the size of the sharpness recovery filter for the low-frequency component is given by 63×63 in the above description. However, a filter of another size may be used, as a matter of course.

Further, in the description above, the color space is converted from RGB to YCbCr, and the convolution operation is performed on Y (luminance signal) in the recovery processing for the low-frequency component. However, the present invention is not limited to this. For example, the color space may be converted into CIE Lab, and the convolution operation may be performed on L (lightness). Alternatively, the convolution operation may be performed on RGB without converting the color space.

Furthermore, the recovery processing for the high-frequency component need not be performed on all color material data, but may be performed only on some of color material amount data, for example, a visually conspicuous color (such as K) or the like. Moreover, unique sharpness recovery filters for the high-frequency component need not necessarily be prepared for all color materials, and the same filter may be assigned to them.

Third Embodiment

In the third embodiment, an arrangement will be described in which recovery processing for a low-frequency component is performed after color separation processing. That is, a difference from the second embodiment is an order between the color separation processing and the recovery processing for the low-frequency component. Note that a description of a common part between the first and second embodiments will be simplified or omitted.

Figure 12:
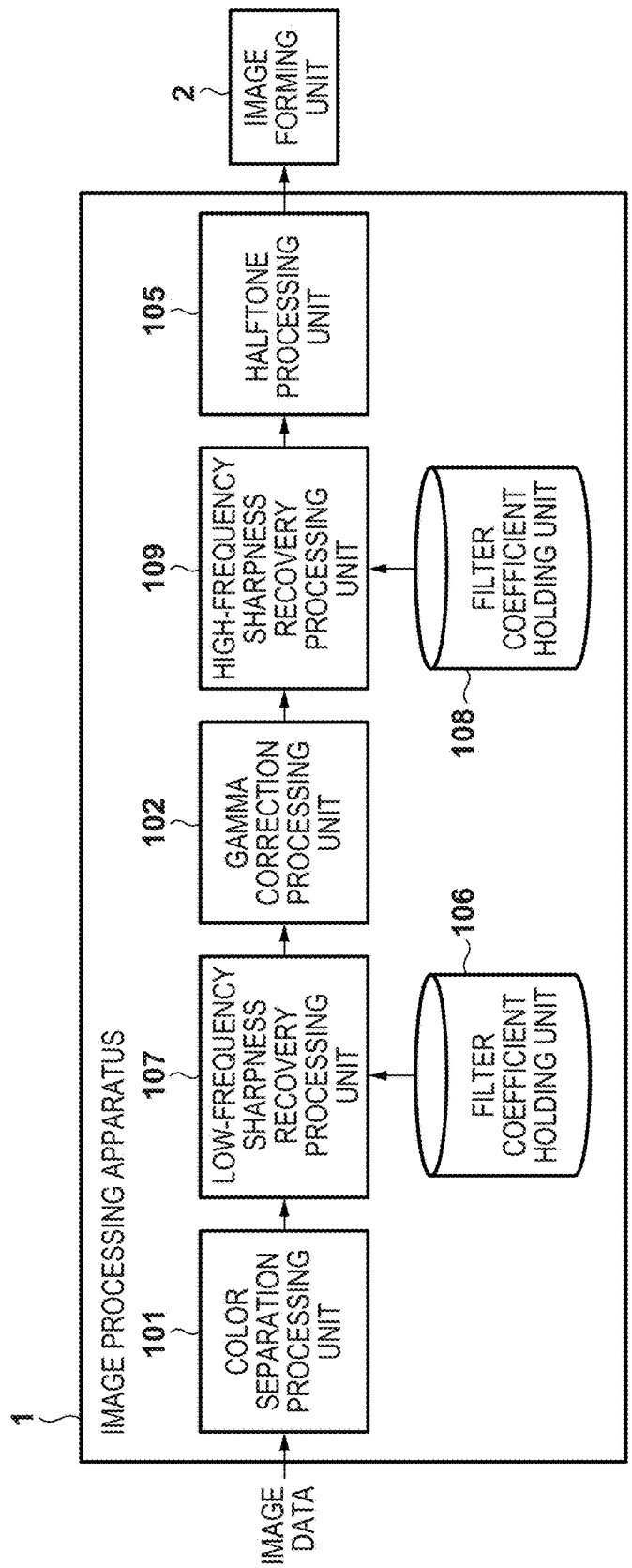
FIG. 12 is a block diagram showing the arrangement of an image forming apparatus according to the third embodiment.

FIG. 12 is a block diagram showing the arrangement of an image forming apparatus according to the third embodiment. As described above, the difference from the second embodiment is that low-frequency recovery processing is performed on color material data output by a color separation processing unit 101.

In general, the characteristic of sharpness degradation changes between color materials. However, adjustment cannot be performed for each color material if the recovery processing for the low-frequency component is performed on a luminance signal as in the second embodiment. To cope with this, in the third embodiment, the low-frequency recovery processing is performed on color material data after the color separation processing. This makes it possible to adjust sharpness recovery of the low-frequency component for each color material.

It is further possible to change the combination of the sharpness recovery of the low-frequency component and sharpness recovery of a high-frequency component. For example, both the low-frequency recovery processing and high-frequency recovery processing are performed on K (black) which is visually conspicuous. On the other hand, none of the sharpness recovery processing operations is performed on Y (yellow) which is visually inconspicuous. Then, only the recovery processing for the high-frequency component is performed on other colors (M (magenta) and C (cyan)). With such an arrangement, it becomes possible to reduce a calculation amount while maintaining a sharpness recovery effect.

Furthermore, the recovery processing for the low-frequency component can reduce the calculation amount by processing reference pixels while thinning them out. It is therefore possible to suppress an increase in calculation amount by performing sharpness recovery dividedly into the low-frequency component and the high-frequency component as in the third embodiment.

As described above, according to the third embodiment, the recovery processing for the low-frequency component is performed after the color separation processing. This makes it possible to adjust the low-frequency sharpness recovery for each color material and reduce the calculation amount while maintaining the sharpness recovery effect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-137051, filed Jul. 11, 2016, which is hereby incorporated by reference herein in its entirety.

What is claimed is:

1. An image processing apparatus which generates, based on input image data, halftone image data used for an image forming process of forming an image on a print medium, the apparatus comprising:
  a conversion unit configured to convert the input image data into color material amount data used for the image forming process;
  a correction unit configured to perform, on the color material amount data, output gamma correction to compensate for non-linearity of an input/output density in the image forming process;

a processing unit configured to perform, on the color material amount data after the output gamma correction, recovery processing to compensate for sharpness degradation of an image formed by the image forming process; and a halftone processing unit configured to perform halftone processing on the color material amount data after the recovery processing to generate halftone image data.

2. The apparatus according to claim 1, wherein a sharpness recovery filter utilized for the recovery processing is a filter which has a reverse characteristic of a frequency characteristic of the image formed by the image forming process and a restricted upper limit of compensation so clipping does not occur in the recovery processing.

3. The apparatus according to claim 1, wherein the conversion unit converts the input image data into N color material amount data corresponding to color materials of N colors, the correction unit performs the output gamma correction on the N color material amount data, and the processing unit performs the recovery processing on less than N color material amount data out of the N color material amount data after the output gamma correction.

4. An image processing apparatus which generates, based on input image data, halftone image data used for an image forming process of forming an image on a print medium, the apparatus comprising:

a first processing unit configured to perform, on the input image data, first recovery processing to compensate for sharpness degradation of a low-frequency component lower than a predetermined frequency in an image formed by the image forming process;

a conversion unit configured to convert the input image data after the first recovery processing into color material amount data used for the image forming process;

a correction unit configured to perform, on the color material amount data, output gamma correction to compensate for non-linearity of an input/output density in the image forming process;

a second processing unit configured to perform, on the color material amount data after the output gamma correction, second recovery processing to compensate for sharpness degradation of a high-frequency component higher than the predetermined frequency in the image formed by the image forming process; and a halftone processing unit configured to perform halftone processing on the color material amount data after the second recovery processing to generate halftone image data.

5. The apparatus according to claim 4, wherein the conversion unit converts the input image data after the first recovery processing into N color material amount data corresponding to color materials of N colors, the correction unit performs the output gamma correction on the N color material amount data, and the second processing unit performs the second recovery processing on less than N color material amount data out of the N color material amount data after the output gamma correction.

6. The apparatus according to claim 4, wherein a second sharpness recovery filter utilized for the second recovery processing is a filter which has a characteristic of correcting a deterioration in a frequency characteristic of the high-frequency component higher than the predetermined frequency of the image formed by the image forming process and a restricted upper limit of compensation so clipping does not occur in the second recovery processing, a first sharpness recovery filter utilized for the first recovery processing is a filter which has a reverse characteristic of a frequency characteristic of the image formed by the image forming process based on image data on which the second recovery processing is performed by using the second filter and a restricted upper limit of compensation so clipping does not occur in the first recovery processing, and the second sharpness recovery filter is smaller in filter size than the first sharpness recovery filter.

7. The apparatus according to claim 4, wherein the predetermined frequency is a frequency at which brightness is decreased by a predetermined amount when recovery processing to compensate for sharpness degradation of the image formed by the image forming process is performed on all frequency components.

8. An image processing apparatus which generates, based on input image data, halftone image data used for an image forming process of forming an image on a print medium, the apparatus comprising:

a conversion unit configured to convert the input image data into color material amount data used for the image forming process;

a first processing unit configured to perform, on the color material amount data, first recovery processing to compensate for sharpness degradation of a low-frequency component lower than a predetermined frequency in an image formed by the image forming process;

a correction unit configured to perform, on the color material amount data after the first recovery processing, output gamma correction to compensate for non-linearity of an input/output density in the image forming process;

a second processing unit configured to perform, on the color material amount data after the output gamma correction, second recovery processing to compensate for sharpness degradation of a high-frequency component higher than the predetermined frequency in the image formed by the image forming process; and a halftone processing unit configured to perform halftone processing on the color material amount data after the second recovery processing to generate halftone image data.

9. The apparatus according to claim 8, wherein the conversion unit converts the input image data into N color material amount data corresponding to color materials of N colors, the first processing unit performs the first recovery processing on less than N color material amount data out of the N color material amount data, the correction unit performs the output gamma correction on the N color material amount data, and the second processing unit performs the second recovery processing on the less than N color material amount data out of the N color material amount data after the output gamma correction.

10. The apparatus according to claim 8, wherein a second sharpness recovery filter utilized for the second recovery processing is a filter which has a characteristic of correcting a deterioration in a frequency characteristic of the high-frequency component higher than the predetermined frequency of the image formed by the image forming process and a restricted upper limit of compensation so clipping does not occur in the second recovery processing, a first sharpness recovery filter utilized for the first recovery processing is a filter which has a reverse characteristic of a frequency characteristic of the image formed by the image forming process based on image data on which the second recovery processing is performed by using the second filter and a restricted upper limit of compensation so clipping does not occur in the first recovery processing, and the second sharpness recovery filter is smaller in filter size than the first sharpness recovery filter.

11. The apparatus according to claim 8, wherein the predetermined frequency is a frequency at which brightness is decreased by a predetermined amount when recovery processing to compensate for sharpness degradation of the image formed by the image forming process is performed on all frequency components.

12. An image processing method of generating, based on input image data, halftone image data used for an image forming process of forming an image on a print medium, the method comprising:

converting the input image data into color material amount data used for the image forming process;

performing, on the color material amount data, output gamma correction to compensate for non-linearity of an input/output density in the image forming process;

performing, on the color material amount data after the output gamma correction, recovery processing to compensate for sharpness degradation of an image formed by the image forming process; and performing halftone processing on the color material amount data after the recovery processing to generate halftone image data.

13. An image processing method of generating, based on input image data, halftone image data used for an image forming process of forming an image on a print medium, the method comprising:

performing, on the input image data, first recovery processing to compensate for sharpness degradation of a low-frequency component lower than a predetermined frequency in an image formed by the image forming process;

converting the input image data after the first recovery processing into color material amount data used for the image forming process;

performing, on the color material amount data, output gamma correction to compensate for non-linearity of an input/output density in the image forming process;

performing, on the color material amount data after the output gamma correction, second recovery processing to compensate for sharpness degradation of a high-frequency component higher than the predetermined frequency in the image formed by the image forming process; and performing halftone processing on the color material amount data after the second recovery processing to generate halftone image data.

14. An image processing method of generating, based on input image data, halftone image data used for an image forming process of forming an image on a print medium, the method comprising:

converting the input image data into color material amount data used for the image forming process;

performing, on the color material amount data, first recovery processing to compensate for sharpness degradation of a low-frequency component lower than a predetermined frequency in an image formed by the image forming process;

performing, on the color material amount data after the first recovery processing, output gamma correction to compensate for non-linearity of an input/output density in the image forming process;

performing, on the color material amount data after the output gamma correction, second recovery processing to compensate for sharpness degradation of a high-frequency component higher than the predetermined frequency in the image formed by the image forming process; and performing halftone processing on the color material amount data after the second recovery processing to generate halftone image data.

15. A non-transitory computer-readable recording medium storing a program that causes a computer to function as an image processing apparatus which generates, based on input image data, halftone image data used for an image forming process of forming an image on a print medium, the apparatus comprising:

a conversion unit configured to convert the input image data into color material amount data used for the image forming process;

a correction unit configured to perform, on the color material amount data, output gamma correction to compensate for non-linearity of an input/output density in the image forming process;

a processing unit configured to perform, on the color material amount data after the output gamma correction, recovery processing to compensate for sharpness degradation of an image formed by the image forming process; and a halftone processing unit configured to perform halftone processing on the color material amount data after the recovery processing to generate halftone image data.

* * * * *